July 21, 1959
G. GOEBEL
2,895,675
TEMPERATURE REGULATOR FOR ROOM HEATERS
Filed Jan. 17, 1955
2 Sheets-Sheet 1
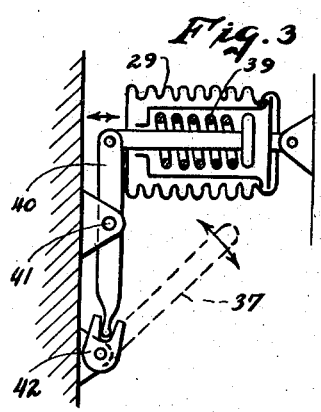
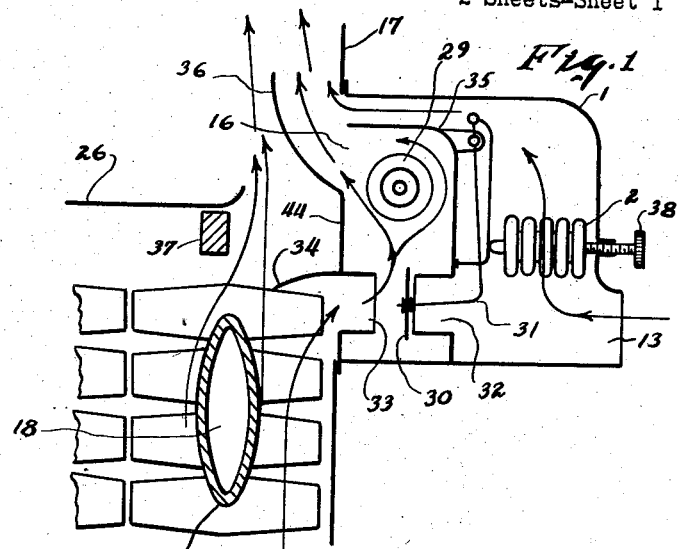
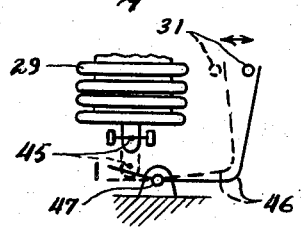
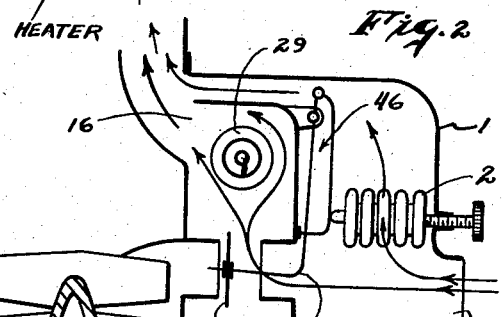
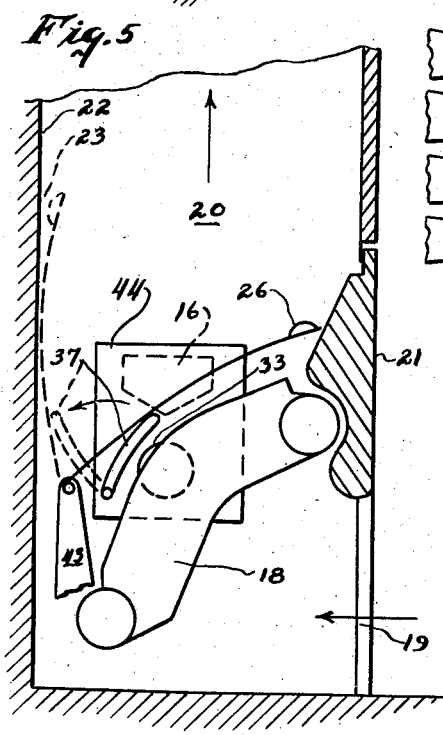
INVENTOR.
GERHARD GOEBEL
BY
*Mestern & Kollin*
ATTORNEYS

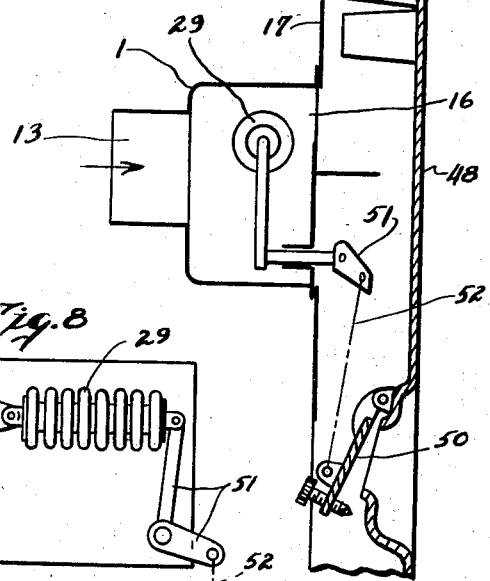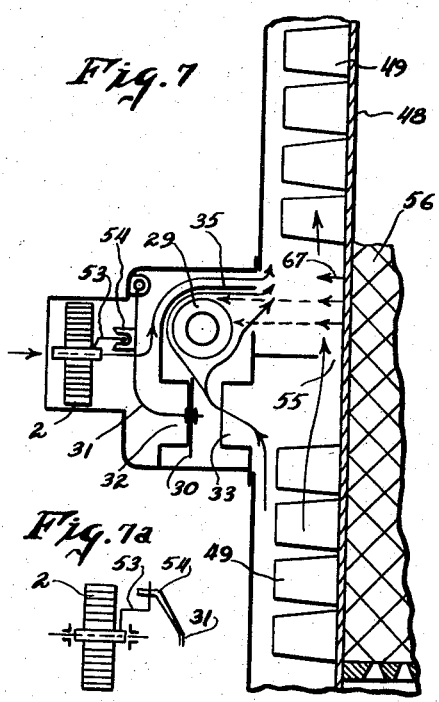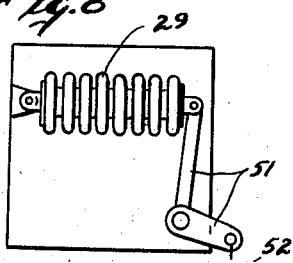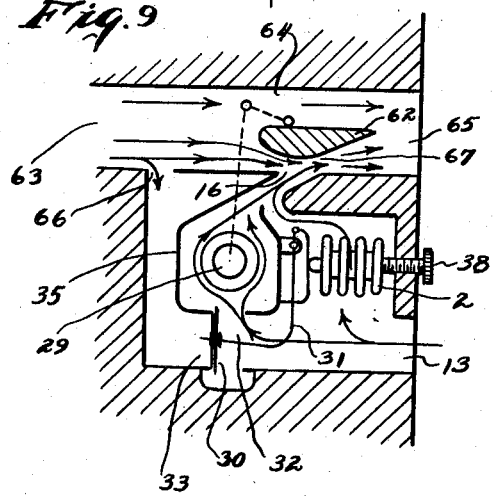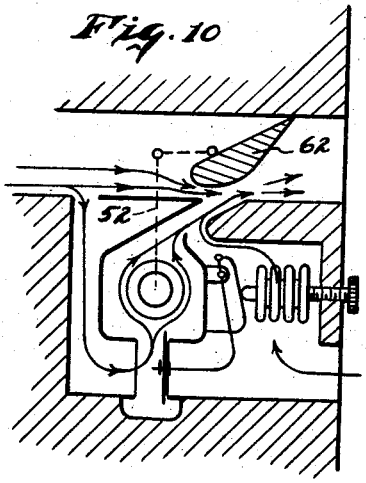

United States Patent Office 2,895,675
Patented July 21, 1959

2,895,675

TEMPERATURE REGULATOR FOR ROOM HEATERS

Gerhard Goebel, Hamburg-Wellingsbuettel, Germany

Application January 17, 1955, Serial No. 482,365

6 Claims. (Cl. 236—9)

This invention relates to a device for automatically regulating the temperature of heated rooms, according to my copending patent application Serial No. 298,169. This copending application has become U.S. Patent No. 2,781,978, which was issued on February 19, 1957.

In the regulating device according to my said copending application, it has been found that in some cases, as in particular for actuating large dampers of convectors, the force of the temperature-sensitive element is insufficient to produce the desired regulating action under small fluctuations in temperature. The aerodynamic forces acting on the damper, and distortion of the damper by temperature effects, were the chief factors interfering with regulation. Full deflection occurred only in response to very wide variations of temperature.

The invention provides for amplifying the regulating force with the aid of an auxiliary force, so that large regulating forces will be generated even by minute fluctuations in the temperature to be regulated. For this purpose, the temperature-sensitive element or pilot thermostat responding to the temperature to be regulated (room temperature) has been separated from a second thermostat generating the regulating force or energy, or so-called "booster" thermostat. This second thermostat is exposed to a considerably magnified temperature fluctuation, whose maximum value is given by the temperature differential as between temperature of heating medium (steam, hot water) and the temperature of the surroundings (room temperature). In proportion to this wider temperature fluctuation, the regulating force or energy is likewise stepped up.

In continuation of the features disclosed by my said copending application Serial No. 298,169, then, the invention provides for a pilot thermostat to actuate a valve means whereby a second or booster thermostat is alternately exposed to a low-temperature medium (for example, room air) and a high-temperature medium (for example, room air that has been heated by the heater). This second thermostat responding to the thus amplified temperature fluctuations actuates a heater valve or damper in the stack of a convector or hot-air heating system.

The accompanying drawing shows embodiments of the invention by way of example. In this drawing, Figs. 1 and 2 show a diagram of a regulating system with booster, installed in the stack casing of a convection heater;

Fig. 3 shows a diagram of the transmission of force from the second or booster thermostat to a control lever;

Fig. 4 shows a diagram of an overload safeguard for the second thermostat;

Fig. 5 shows a sectional sketch of a convector with automatically controlled air flap;

Figs. 6 and 7 diagrammatically show a temperature-regulating system on a convection heater; the pilot thermostat being in this instance, by way of example, a bimetallic spiral;

Fig. 7a represents the transmission of force from the bimetallic spiral to a linkage;

Fig. 8 shows a simplified diagram of the transmission of force;

Figs. 9 and 10 diagrammatically show a temperature-regulating system for a hot-air heater, with open and closed air flap respectively.

The general structure and function of such a control system will now be described in terms of the example of a control system for a convector (Figs. 1 to 5). Casing 1 with back 44 is attached to the stack wall 17 of a convector. The updraft in the stack 20 of a convector causes air to be drawn in through an opening 16 in the back 44 of the casing. This air, chiefly unaffected room air, is drawn in through an inlet 13 and acts on a temperature-sensitive element 2. This pilot thermostat 2, via a linkage 31, actuates a valve means 30, in this instance a damper. This valve means 30 alternately opens a cold-air opening 32 (supplied with cold room air through inlet 13) and a hot-air opening 33 leading into the convector stack in the immediate vicinity of a heating means 18. A baffle 34 serves to promote entry of hot air into the hot-air opening. Behind this valve means, there is a second or booster thermostat 29. This is so enclosed by a partition 35 as to be supplied with air only from valve means 30. The enclosure also opens into the common outlet 16. The pilot thermostat 2 and second thermostat 29 are in this instance, by way of example, provided in the form of bellows filled with a readily volatilizable liquid.

If the room temperature is above the selected temperature set by means of a screw 38, the pilot thermostat 2 will expand. As a result, via linkage 31, the valve means 30 is moved to the right, thereby clearing the hot-air opening 33. The second thermostat 29 is then surrounded by hot air at a considerably higher temperature than that of the room-air, and likewise expands. This second thermostat, via lever 40 on fixed pivot 41 and slide bearing 42, then actuates the regulating lever 37, which operates the damper 26 in the stack 20 of the convector. In this case, the damper 26 closes. It is in close contact both at its lower support 43 and at the front closure 21, so that the convector stack is closed and air cannot pass through, thus sharply reducing the heat output of the heating means 18.

If the room temperature drops below the selected temperature, the pilot thermostat 2 contracts, the valve flap 30 drifts to the left, and opens the cold-air opening 32. The second thermostat 29 is then cooled, assuming substantially room temperature. It therefore contracts and accordingly opens the regulating damper, with the aid of lever 37, to open position 23 (Fig. 5). The damper is then placed along the back wall 22 of the convector, exposing the entire cross-sectional area, so that the full air volume can be admitted at 19 and heated by the heating means 18.

The rigidity and strength of the second thermostat 29 can be augmented by means of internal springs and guiding means 39. To prevent overload of the second thermostat 29 by excessive thermal action, the invention provides for this thermostat 29, in the position of maximum expansion, to actuate a lever 46 by means of a stop 45, which lever rotates upon point 47 and so acts upon the valve linkage 31 that the valve means 30 will clear the opening 32 for the cold medium (cold-air opening). As a result, the valve means 30 will establish a temperature precisely corresponding to that required for maximum expansion of the second thermostat.

Since the force developed by the second thermostat is sufficient, the damper 26 need not be counterpoised.

By means of suitable construction of linkage 31 and leverage 40 to 42, it is alternatively possible to have the second thermostat open damper 26 when hot air is supplied to it.

In such a system, the second thermostat will be heated when the pilot thermostat cools, and conversely will cool when the temperature-sensitive element is heated. Since thermal influence of the second thermostat upon the pilot thermostat cannot be entirely eliminated, the two thermostats will act against each other in this arrangement, with resulting stationary intermediate positions of the valve system, particularly the second thermostat. With concurrent heating and/or cooling of both thermostats, the travel of the temperature-sensitive element would be thermally amplified by the second thermostat, with resulting resonance, causing the valve system, and particularly the second thermostat, to keep oscillating between the two extreme positions. Stationary intermediate positions could hardly occur in the concurrent arrangement.

Alternatively, the second thermostat 29 may actuate a heater valve and thereby control the room temperature by shutting off the supply of heating medium.

If the regulating system is provided with a heated auxiliary stack serving to produce a draft, it may analogously be employed for radiators and other heating means.

Between resetting of the pilot thermostat 2 and corresponding repositioning of the damper, a certain reaction time will elapse, due to the lag of the second thermostat. This reaction time will be greatest when the heater is turned on and off, and is hence frequently troublesome. The invention accordingly provides that the heat be shut off and turned on at the regulating means (damper) itself, while the regulator remains adjusted to the usual service temperature.

Application of this control system to stoves will be explained in terms of the examples represented in Figs. 6 to 8. This is essentially the same control system as previously described for convectors. By way of modification, the pilot thermostat 2 has here been shown as a bimetallic spiral which, via lever 53 and fork 54, actuates linkage 31 and hence the damper 30. The regulator casing 1 is here attached to the stack wall 17 of a convection stove. By means of ribs 49 attached to the fire wall 48, the stack is heated, producing updraft and suction upon the outlet 16 of the regulator. 56 represents the fuel charge. The ribs below the control system provide for heating the air which passes when required through the hot-air opening 33 to heat the second thermostat 29. The construction 55 provides for maintenance of an adequate pressure drop between hot-air opening 33 and outlet 16 to ensure hot-air circulation. The second thermostat 29 actuates the combustion-air damper 50 via leverage 51 and chain 52.

In the first place, then, the various dampers 50, 59 are controlled in relation to room temperature by means of the pilot thermostat 2. At the same time, however, this regulating system also acts as overload safeguard and as a safeguard against interruption of firing. The safeguard against overload consists in that the second thermostat 29 is in some degree also exposed to radiation 67 from the fire wall 48. Since heat transfer by radiation increases considerably more with increasing temperature than heat transfer by convection, the room air ceases to provide sufficient cooling, for example from a certain temperature of the fire wall 48, to keep the second thermostat 29 at low temperature. It will therefore heat up even when the valve means 30 has opened the cold-air opening 32, and close the combustion-air damper.

Security against interruption of firing consists in that when the fire goes down, the temperature of the air in the stack will fall too. The regulating system is so arranged that the combustion-air damper will close when the second thermostat 29 heats up. Hence when the temperature of the air in the stack decreases, the temperature of the second thermostat also decreases, and even if the room temperature is still above the selected value, and the hot-air opening 33 therefore remains open. Consequently the combustion-air flap will open.

Conventional radiators can also be equipped with such regulating systems provided they have a supplementary convection shaft (auxiliary shaft) heated from the furnace.

In hot-air heating systems, where the heater proper is not located in the room being heated, the regulating system according to the examples in Figs. 9 and 10 may be employed, where the air is drawn towards outlet 16 through a Venturi tube 61 formed by a flap 62. This Venturi tube 61 must be located in the vicinity of the outlet 65 of the hot-air duct 63 so that there will be a sufficient negative pressure relative to the room. The resulting suction draws in both cold air at 13 and, in proper position of the valve means, hot air at 66. The flap 62 is connected to the second thermostat by a chain 52 or the like. In Figs. 9 and 10, as in Figs. 1 and 2, heating and cooling of the second thermostat 29 respectively opens and closes the damper 62. In open position, this damper 62 exposes a cross section 64, while near the outlet 16, even in closed condition, the cross section required for the venturi effect remains open.

What I claim is:

1. A temperature regulator for room heaters, including an auxiliary regulating device, with a heating element heated by fluid medium, said temperature regulator comprising as an assembly unit a casing with an inlet and an outlet opening, a pilot thermostat arranged in said casing, said inlet opening being capable of drawing-in room air under the influence of suction established at said outlet opening by a stack in said heating system, said draft of air from the inlet opening affecting the pilot thermostat, a second thermostat mounted in a separate enclosure within said casing, adjacent to said pilot thermostat but separated by a wall of said enclosure therefrom, said enclosure having an inlet and an outlet opening, a valve controlled by said pilot thermostat so as to alternately admit a cold or hot medium to said second thermostat, and means for connecting said second thermostat to a second valve arranged outside said unit in said stack, whereby temperature fluctuations of the second thermostat actuate said second valve.

2. A temperature regulator for room heaters, including an auxiliary regulating device, with a heating element heated by fluid medium, said temperature regulator comprising as an assembly unit a casing with an inlet and an outlet opening, a pilot thermostat arranged in said casing, said inlet opening being capable of drawing-in room air under the influence of suction established at said outlet opening by a stack in said heating system, said draft of air from the inlet opening affecting the pilot thermostat, a second thermostat mounted in a separate enclosure within said casing, adjacent to said pilot thermostat but separated by a wall of said enclosure therefrom, said enclosure having an inlet and an outlet opening, a valve controlled by said pilot thermostat so as to alternately admit a cold or hot medium to said second thermostat, and means for connecting said second thermostat to a second valve arranged outside said unit in said stack, whereby temperature fluctuations of the second thermostat actuate said second valve, and an overload safeguard mechanism provided for cooperation with said second thermostat, said mechanism comprising linkage which, in position of maximum expansion of the second thermostat, causes the first valve means to open the inlet for the cold medium.

3. A temperature regulator for room heaters, including an auxiliary regulating device, with a heating element heated by fluid medium, said temperature regulator comprising as an assembly unit a casing with an inlet and an outlet opening, a pilot thermostat arranged in said casing, said inlet opening being capable of drawing-in room air under the influence of suction established at said outlet opening by a stack in said heating system, said draft of air from the inlet opening affecting the pilot thermostat, a second thermostat mounted in a separate enclosure within said casing, adjacent to said pilot thermostat but separated by a wall of said enclosure therefrom, said enclosure having an inlet and an outlet opening, a valve controlled by said pilot thermostat so as to alternately admit a cold or hot medium to said second thermostat, and means for connecting said second thermostat to a second valve arranged outside said unit in said stack, whereby temperature fluctuations of the second thermostat actuate said second valve, and means for directly shutting off the heat at the second valve means, while the regulating device remains adjusted to the usual service temperature.

4. A temperature regulator according to claim 1, wherein the pilot thermostat so influences the second thermostat through the first valve means that, when the pilot thermostat is cooled, the second thermostat is exposed to a higher temperature, and conversely when the pilot thermostat is heated, the second thermostat is exposed to a lower temperature.

5. A temperature regulator for direct attachment to a room heater with a heating element heated by fluid medium, said temperature regulator comprising as an assembly unit a casing having an outlet and two inlet openings, said outlet opening being connected to a stack providing suction, one of said inlet openings being capable of drawing-in room air under the influence of said suction, and the second of said inlet openings being capable of drawing-in heated air which has passed over said heating body, a pilot thermostat mounted near said first inlet opening within said casing, responsive to room temperature, a second thermostat mounted in a separate enclosure within said first casing, and having an outlet opening near the first outlet opening, an inlet opening for hot air in common with said hot air opening of said casing and a second inlet opening communicating with the inlet opening for room air of the casing, a valve actuated by said pilot thermostat for alternatingly opening and closing said inlet openings for admission of hot air and cold air to said second thermostat, a second valve in said stack and linkage responsive to said second thermostat for actuating said second valve.

6. A temperature regulator according to claim 1, wherein the said regulator is mounted on the stack wall of a convection stove, and the second thermostat actuates the combustion-air damper of the stove, said second thermostat responding not only to room temperatures via the pilot thermostat, but also, in the event of overload, to the then predominant radiation of the said stove, thereby likewise closing the combustion-air damper.

References Cited in the file of this patent

UNITED STATES PATENTS

| | | |
|---|---|---|
| 998,767 | Fulton | July 25, 1911 |
| 1,917,880 | Frantz | July 11, 1933 |
| 2,259,061 | Caffier | Oct. 14, 1941 |
| 2,263,103 | Rathbun | Nov. 18, 1941 |
| 2,659,535 | Hotchkiss | Nov. 17, 1953 |

FOREIGN PATENTS

| | | |
|---|---|---|
| 70,835 | Austria | Jan. 10, 1916 |